Dec. 5, 1933.  I. S. MOSHER  1,937,904
DOUGH CUTTER
Filed Nov. 13, 1931  6 Sheets-Sheet 1

Inventor
Ira S. Mosher

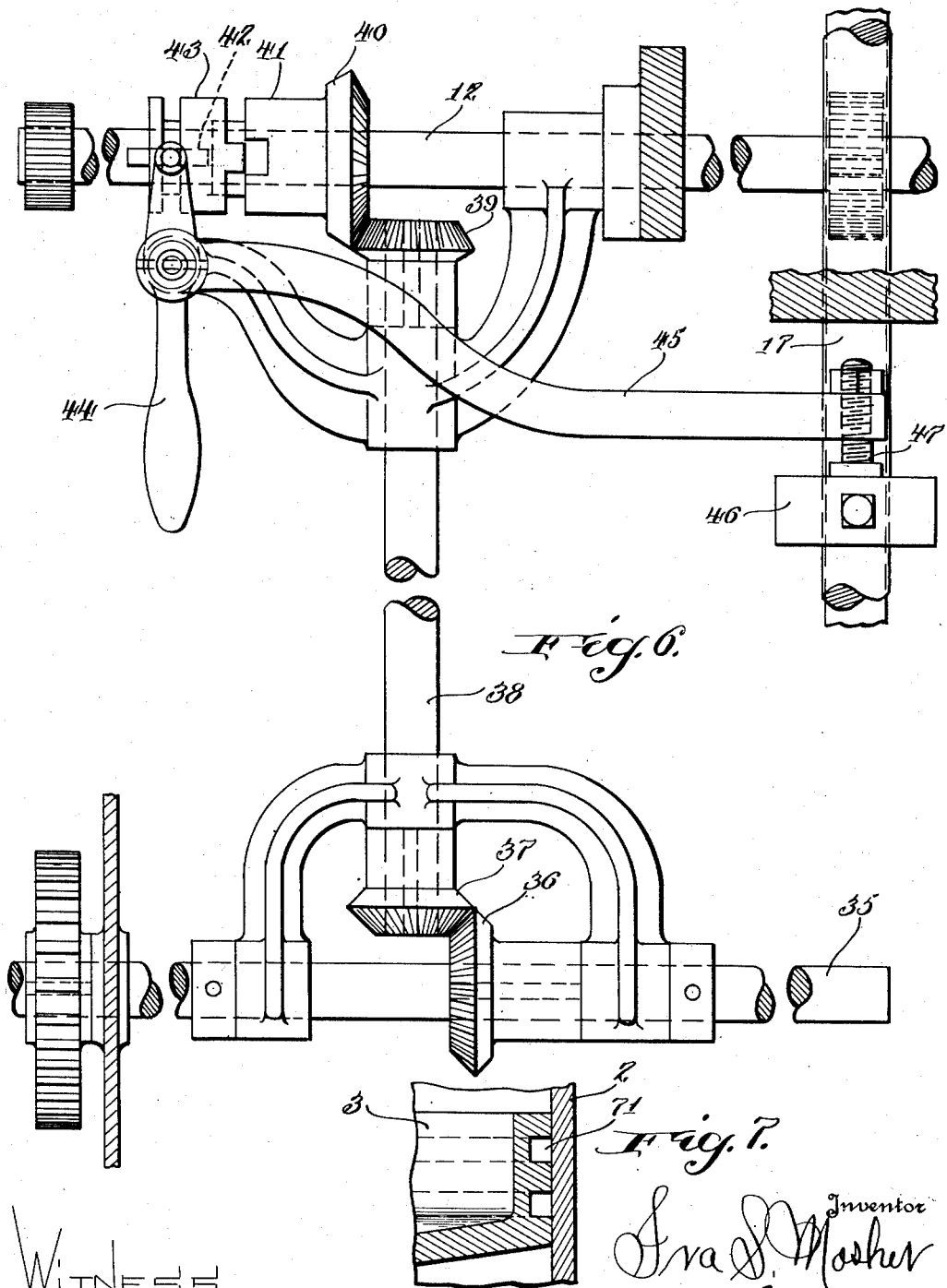

Patented Dec. 5, 1933

1,937,904

UNITED STATES PATENT OFFICE 1,937,904

DOUGH CUTTER

Ira S. Mosher, East Orange, N. J., assignor to Joe Lowe Corporation, Brooklyn, N. Y., a corporation of Delaware Application November 13, 1931
Serial No. 574,755

16 Claims. (Cl. 107—14)

The invention relates to a cutting device which in the form shown is applied to ring doughnuts or other ring cakes, but which is capable of more general application as to doughnut sticks, bread, doughnuts, cake and other food products made from plastic dough or the equivalent and not necessarily of ring shape.

The object of the invention is to so control the supply of dough or plastic material which is fed to the cutter as to facilitate the production of cakes or doughnuts of uniform weight and size.

The necessity for such uniformity is generally recognized by the trade, both on economical grounds and as an incident to the pleasing appearance of the product.

An important feature of the invention consists in a hydraulic retarding or equalizing device connected to the feed and comprising regulating means within the convenient and easy control of the operator, the feed of the dough and hence the pressure with which the dough or plastic is fed to the cutter and hence the size of the product being directly proportionate to the movement of the controlling fluid whereby the feed is maintained uniform or at the will of the operator, is minutely and accurately adjusted giving a product which is precisely uniform or varied in size as desired.

In the accompanying drawings I have illustrated my improvement in connection with a doughnut or cake cutting device or so much thereof as is regarded as essential to a comprehension of the same and its operation.

In the drawings:

Figure 6 is a fragmentary view of a drive for withdrawing the pistons in the oil and dough cylinders to refill the latter.

Figure 7 is a fragmentary section through the dough cylinder wall and the periphery of the piston showing a device for preventing the dough from passing the piston.

Figure 1:
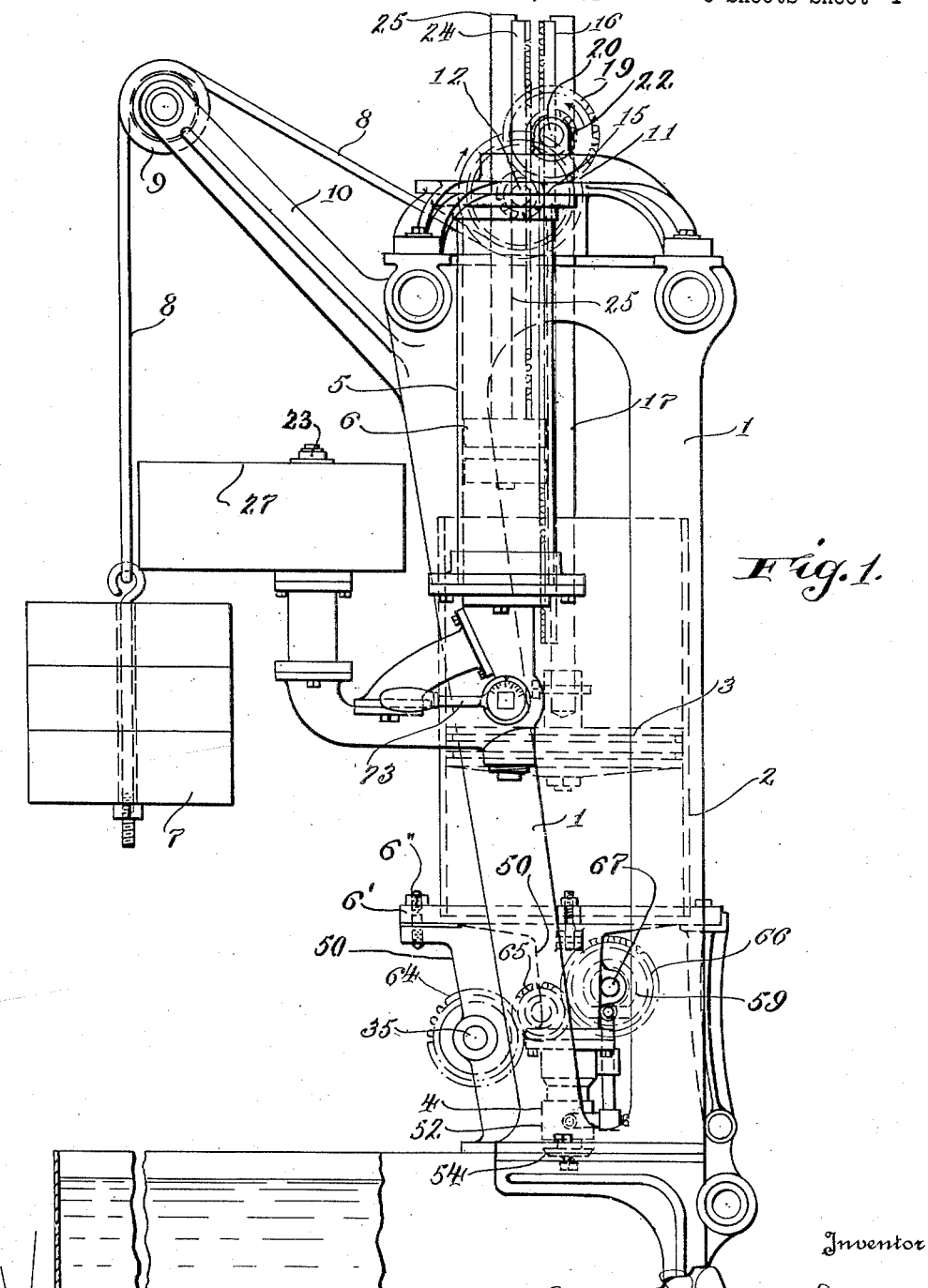
Figure 1 is an elevation of the cutter provided with feeding means for the dough or plastic and the control of the invention.
Figure 2:
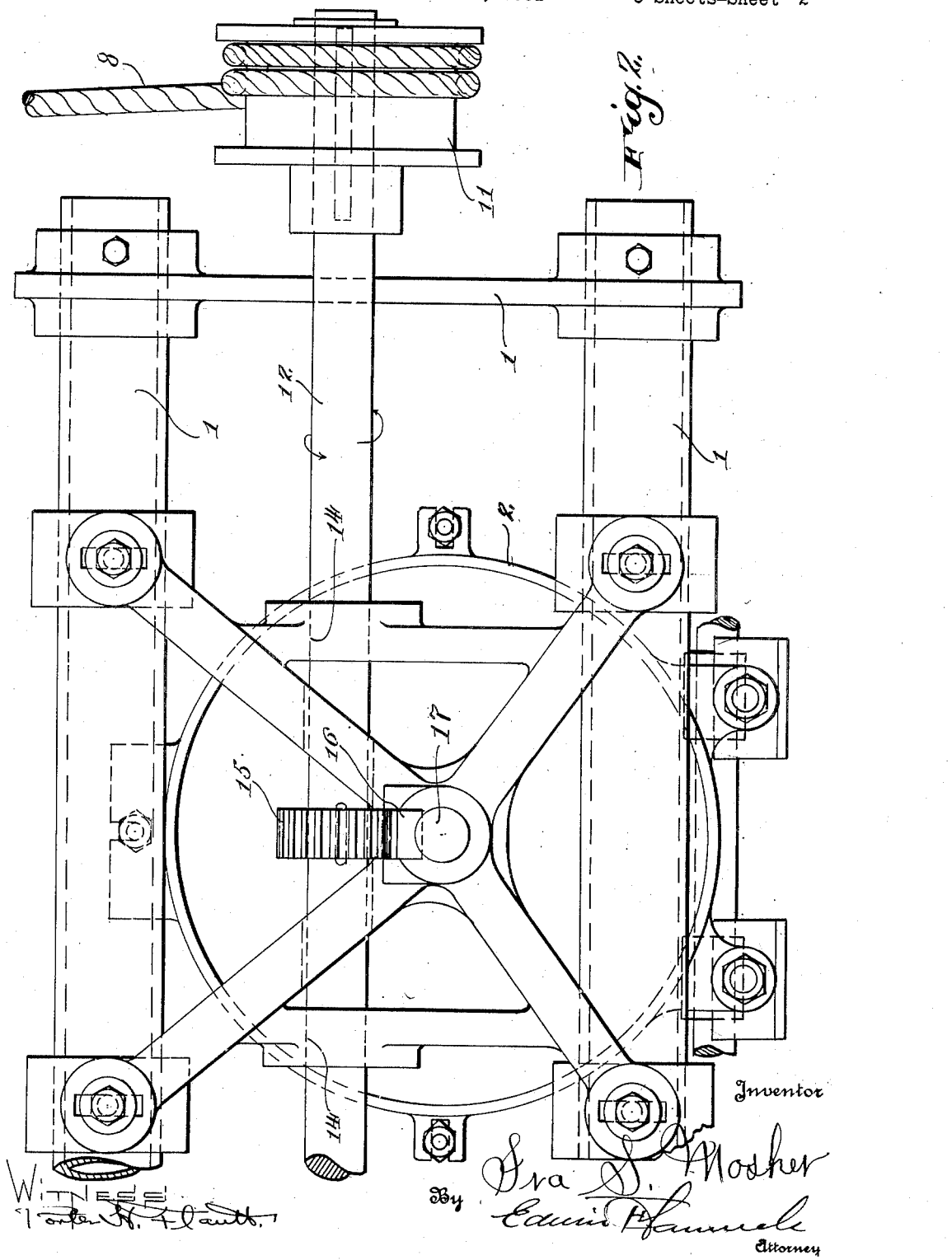
Figure 2 is a top plan view fragmentary in its nature showing the dough cylinder, piston and operating means, including the pinion shaft.

Referring to the drawings by numerals, each of which is used to indicate the same or similar parts in the different figures, the machine to which the invention is applied for purposes of illustration comprises a frame 1, on which is supported a dough tank shown in the form of a cast aluminum cylinder 2 open at the top and containing a piston 3 by which the dough is forced downwardly and fed to the cutter mechanism 4 as hereinafter described. The illustration also includes an hydraulic cylinder 5, the hydraulic fluid being preferably oil. Fitting and sliding in this cylinder is a piston 6 by which the desired hydraulic pressure is obtained. The piston 3 is capable of withdrawal from the dough cylinder or tank 2, to permit the latter to be filled with dough, but the oil in the hydraulic cylinder is returned by by-passing as hereinafter described.

In the form of the invention shown a uniform downward tendency is imparted to both the dough piston 3 and the hydraulic piston 6 in any suitable manner as by means of a weight 7 held suspended from a cable 8. In the form of machine shown this cable is passed over a guide pulley 9 supported on an arm or bracket 10 which extends upwardly and outwardly from the frame 1 to a sufficient extent to give room for the operation of the weight 7. The cable 8 is then secured to and passed around a drum 11 mounted for rotation on the machine frame, being preferably secured to the horizontal drum shaft 12 mounted in suitable bearings 14 on the frame.

This shaft 12 in the form of the invention shown carries a pinion 15 which meshes with a rack 16 formed on or secured to the rod 17 of the dough piston 3. The shaft 12 also carries at its extreme end best illustrated in Figure 3 a toothed pinion 18 which meshes with a toothed gear 19 on a horizontal shaft 20, mounted in suitable bearings 21 on the machine frame 1. This shaft 20 carries a pinion 22 secured thereto, which meshes with a rack 24 formed on or secured to the rod 25 of the hydraulic piston 6. Thus the two pistons are connected together to move together and proportionately so that by controlling the oil piston, the dough piston and feed are controlled. The gear ratio shown is such that the dough piston moves twice as fast as the oil piston, but the speed ratio is not essential.

Figure 3:
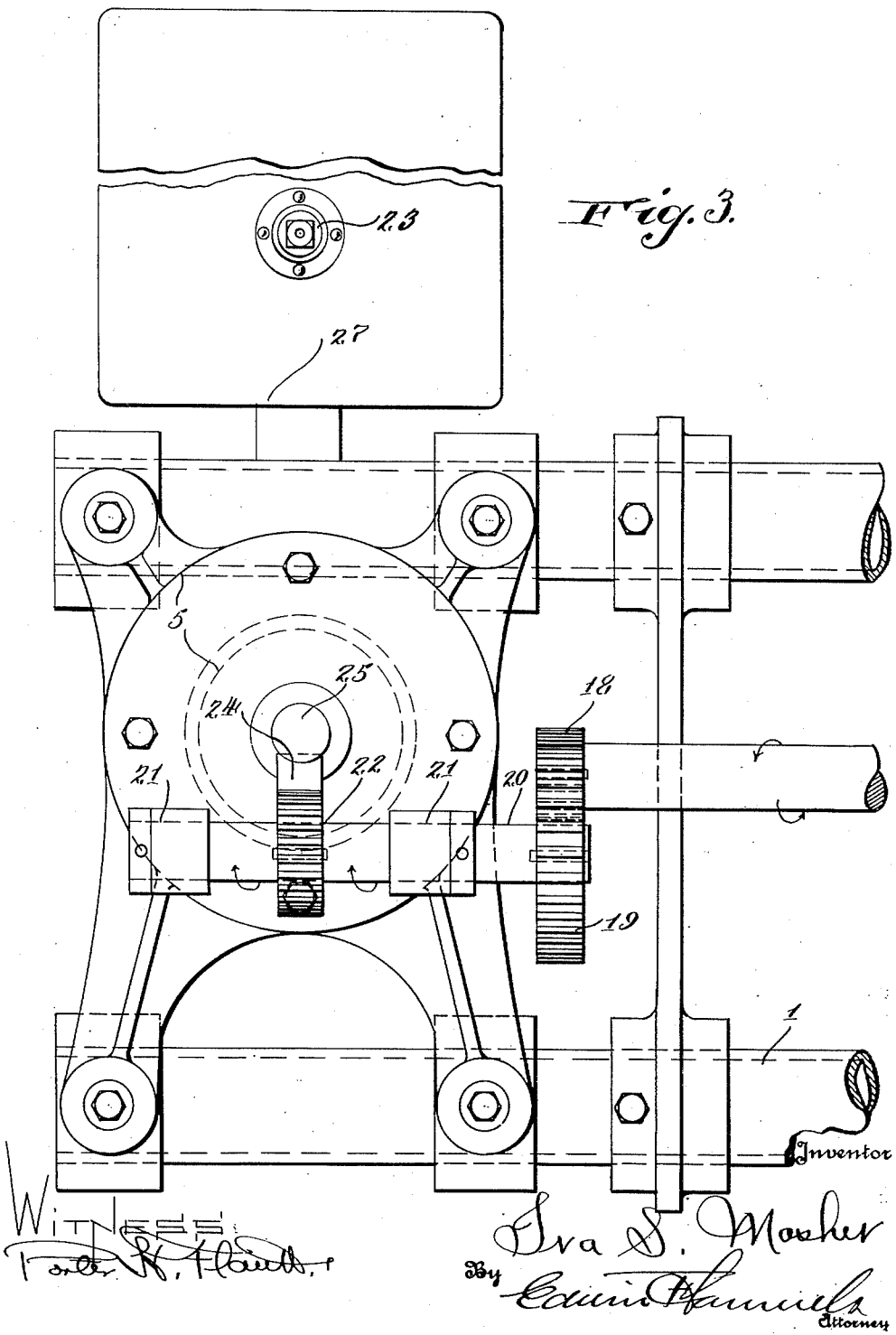
Figure 3 is a plan view also fragmentary and continuous with Figure 2 showing the remainder of the machine including the other end of the operating shaft and the oil cylinder and tank.
Figure 4:
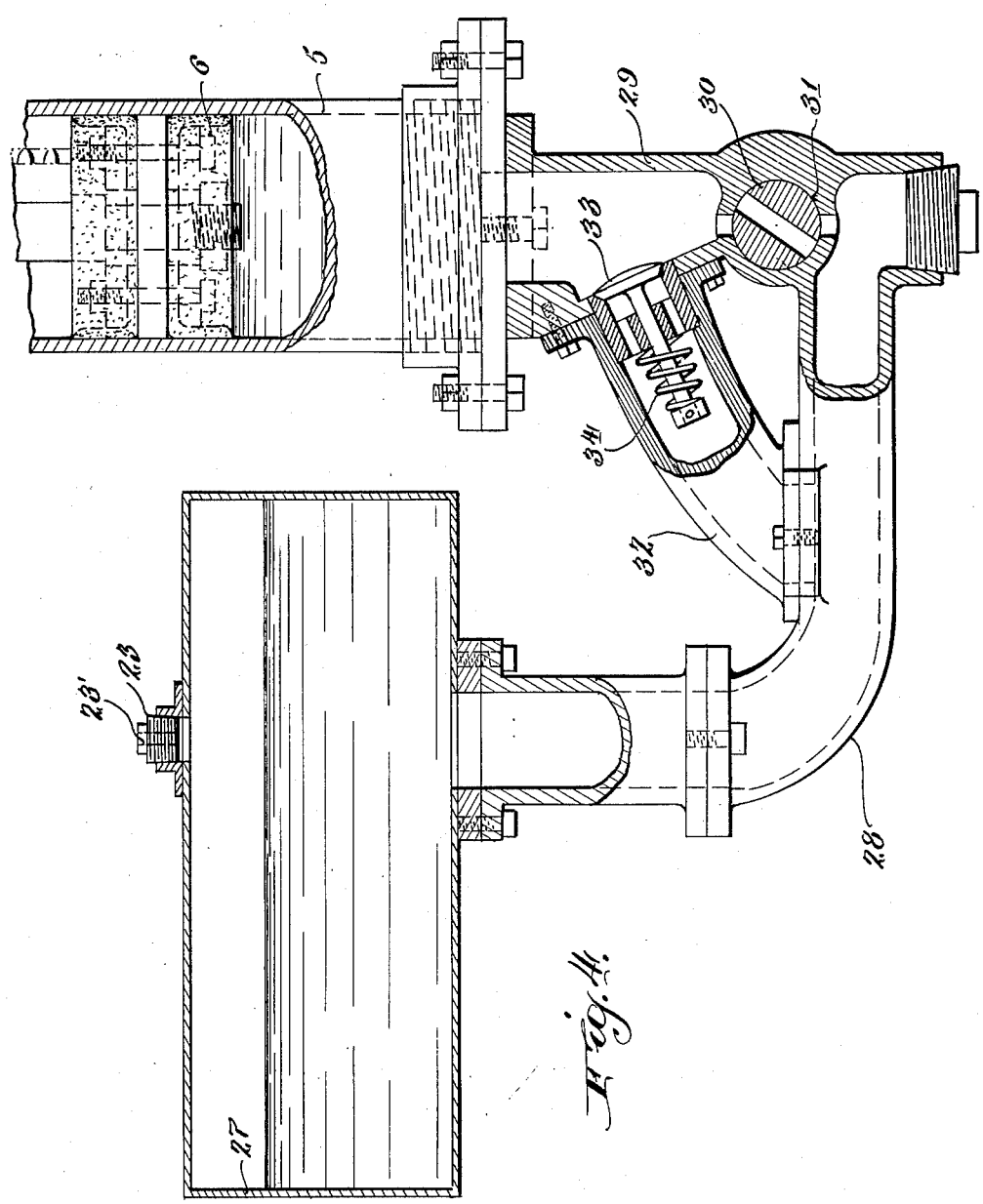
Figure 4 is an elevation certain of the parts being shown in section, of the hydraulic or oil control.

A supply of hydraulic fluid, preferably oil, for operation of the hydraulic control, is contained in tank 27 shown in Figures 1, 3 and 4. This tank 27 is connected at the bottom by means of a pipe 28 preferably U shaped, to the bottom or pressure end of the hydraulic cylinder 5. The arm of the U leading downwardly from the cylinder at 29 is shown as provided with a rotary plug valve 30 and a suitable seat therefor 31, the same being spaced well downwardly from the hydraulic cylinder and the U shaped pipe 28 is provided with a bypass 32, connected to the U on both sides of the plug valve 30, the said bypass containing a check or poppet valve 33 which is normally closed by means of a spring 34. This valve opens toward the hydraulic cylinder and is for convenience in returning the fluid from tank 27 to the cylinder 5 on withdrawing or raising the hydraulic piston when a complete charge or tank full of dough has been fed, and it is desired to return the parts to initial position. The tank 27 is shown as provided with a filler plug 23 having an air vent 23' to facilitate the flow of the liquid to and from cylinder 6.

The machine may, if desired, be provided with the means shown in Figure 6 for returning the dough or plastic feeding piston 3 and the hydraulic piston 6 to initial position, i. e., for raising them after the charge of dough has been fed to and through the cutter. This device may be operated from any suitable source of power, it being shown as connected to the cutter drive shaft 35 to be further described. For the purposes of the present device, the shaft 35 may carry a bevel gear 36 which meshes with a second bevel gear 37 on a shaft 38 extending upwardly to the vicinity of the drum shaft 12. The shaft 38 carries at its upper end a bevel gear 39 which meshes with a bevel gear 40 which rotates freely relatively to the shaft 12. This gear 40 is provided with a jaw clutch member 41 whereby it is connected to the shaft 12 to drive the same at the will of the operator, said operative connection being accomplished by means of the clutch member 43 keyed to the shaft 12 at 42 and operated by sliding the same along the shaft into and out of engagement with the clutch member 41 in any suitable manner as by means of a hand lever 44. The clutch lever 44 is shown as provided with an automatic releasing arm 45 which extends into the path of a dog 46 carried by the piston rod 17 of the dough piston, although it is immaterial to which piston the dog 46 is secured. The automatic releasing arm 45 is shown as provided at its end with an adjustable contact 47 for engagement by and with the dog 46.

It will be understood that the clutch 43 is thus automatically released at the end of the upward traverse of the pistons 3 and 6, which being connected together are moved upward simultaneously by the mechanism described. These pistons may, if desired, be withdrawn manually or in any other suitable manner and they are preferably so arranged that the piston 3 leaves its cylinder opening it for the admission of dough while piston 6 is still in the oil cylinder 5.

Figure 5:
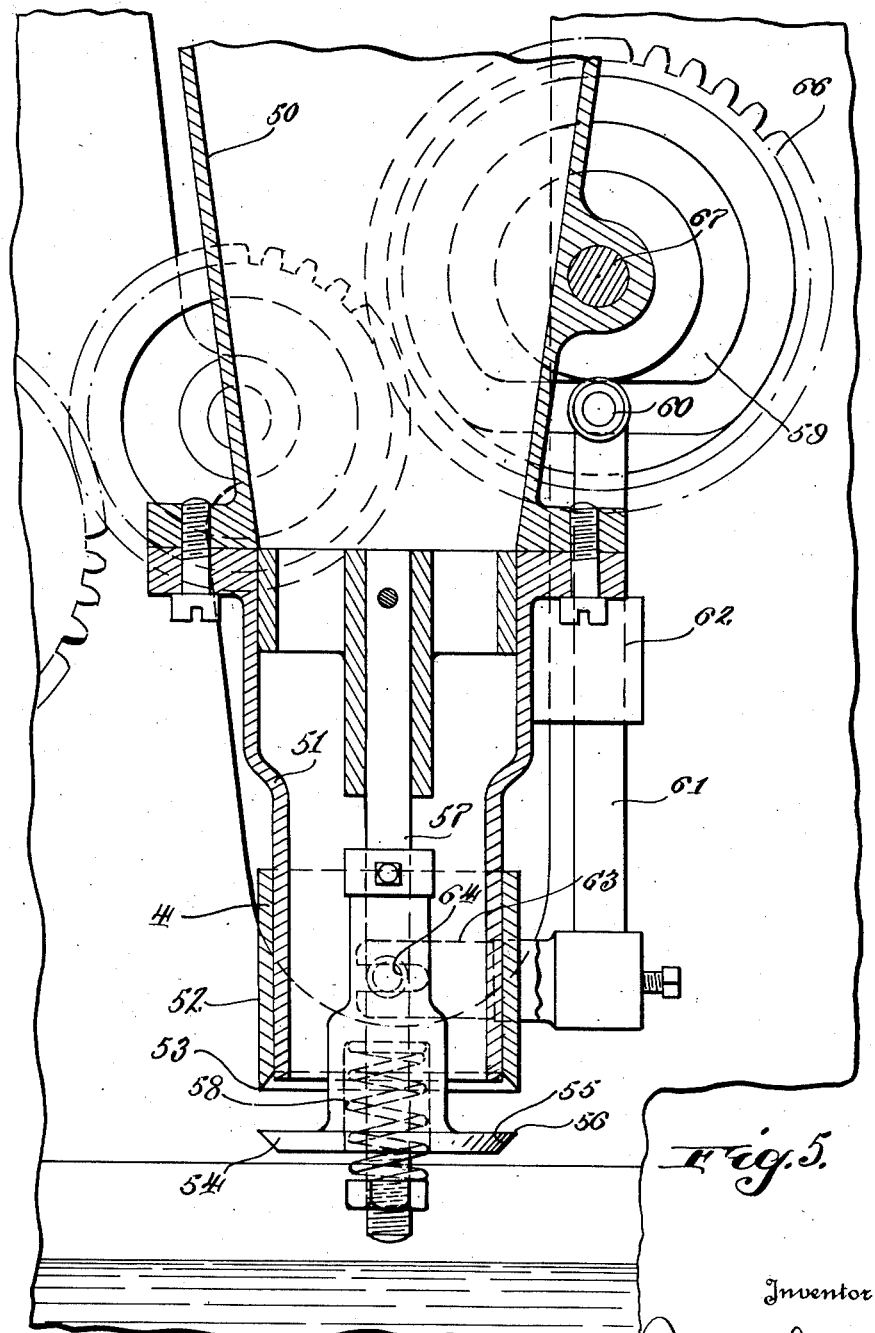
Figure 5 is a vertical section on the line of the axis through the cutter and funnel or passage which feeds the same.

Figures 1 and 5 show a cutter mechanism which may be used with the hydraulic pressure or feed control of the invention for cutting ring doughnuts or cakes, it being understood that any kind of cutter of the ring or other type may be used. In accordance with the construction shown, the dough tank or cylinder 2 is connected by a passage 50, with the top of a cutter tube 51. This passage 50 is shown as tapered but this is not essential. The cutter tube is shown as provided at its lower end with an externally located cutter sleeve 52 which encircles the end of the tube 51 and slides thereon. This cutter sleeve 52 has at its lower end a peripheral cutting edge 53, and the cutting end of the sleeve 52 is closed at intervals by a disk 54 which is bevelled at 55 as to its periphery to provide a peripheral cutting edge 56 to cooperate with the cutting edge 53 of the sleeve. In the form of machine shown the disk 54 is mounted to slide on a central pin or shaft 57 on which it is yieldingly supported by a spring 58 or in any suitable manner, the details of the cutter not being essential, and the cutter sleeve 52 is moved up and down in the cutting operation by means of a cam 59 which engages a follower 60 mounted on a shaft 61, which slides in bearings 62 on the machine frame and carries at its lower end a fork 63 which is slotted to engage pins 64 which are seated in and project outwardly from the sleeve 62. The spring suspension of the disk is mainly to prevent injury of the cutting edges or of the other parts of the mechanism by a positive thrust of the cutter against the disk and at the same time to provide a cutting engagement the pressure of the cutting edges being adjustable in any convenient manner as by means of nut 69 on the pin 57.

The cam 59 may be driven in any suitable manner as by means of a train of gears the first of which 64, is mounted on the cutter drive shaft 35 which is driven from any suitable source of power. This gear 64 meshes with a toothed pinion 65 which, in turn, meshes with a toothed gear 66 secured to the shaft 67 on which the cam 59 is mounted.

In Figure 7 I have illustrated an improved device for feeding the dough. In accordance with the improvement, the piston 3 in the dough cylinder 2 is formed with peripheral grooves 71 in which the dough accumulates, serving as a packing and having the effect of preventing the escape of the dough past the plunger. It is also of interest that the cylinder or dough tank 2 is not only open at the top so that the piston 3 being removed the tank or cylinder can be easily filled but it is also open at the bottom and secured to funnel or passage 50 by flange 6' and bolts 6" permitting it to be easily removed for cleaning, etc.

In the operation of the machine the piston 3 is first raised so as to permit the insertion of a charge of dough into the cylinder. The hydraulic piston 6 being geared to the piston 3 will be raised, but in the form shown the gearing is so proportioned that its speed is only half that of the dough piston 3 so that it is not withdrawn from the hydraulic cylinder 5 in which it reciprocates when the dough piston reaches its top position. When the dough is inserted in the tank or cylinder 2, the weight 7 is permitted to move the piston 3 into contact therewith, and if the operation of the machine is to be delayed for any reason, the valve 30 in the hydraulic system is closed. When the operator is ready to proceed, the shaft 35 is placed in rotation reciprocating the cutting sleeve 52, it being understood that any type of cutter may be substituted for the one shown for the purposes of illustration. The valve 30 controlled by the hand lever 73 in Figure 1 is then opened, the size of the product being carefully observed by the operator. The size of the opening of the valve 30 which is capable of minute regulation, is then adjusted to give the exact size of cake, doughnut or more particularly, the doughnut blank which is desired.

In this connection, it should be understood that the pressure applied by the weight 7 to the pistons 3 and 6, is constant and said pistons being positively connected and the hydraulic fluid being incompressible, the size of the opening of the valve 30 being constant, the advance of the pistons, determined by the valve opening and the action of weight 7 will be at a constant speed and the speed of the cutter being likewise constant, the blanks or cakes produced by the cutter will be of exactly uniform size and weight, assuming that the consistency of the plastic is likewise uniform. When a change is desired, the rate of advance of the pistons and hence the rate of feed can be instantaneously regulated to any desired degree of accuracy. If preferred, the valve 30 may be calibrated as indicated in Figure 1.

When the charge contained in the cylinder 2 has been fed, the pistons 3 and 6 may be raised in any suitable manner as by means of gearing shown in Figure 6 and a new charge inserted, it being understood that the poppet valve 33, which is opened on the upstroke of the piston 6, provides for the transfer of the hydraulic fluid from the tank 27 to the cylinder 5 without undue resistance, permitting the pistons to be raised with a corresponding lack of resistance. The air vent 23' in tank 27 also contributes to this result by breaking the vacuum in the tank.

I have thus described specifically and in detail a flow control for a cake cutter embodying the features of my invention in the preferred form, the description being specific and in detail in order that the manner of constructing, applying, operating and using the same may be fully understood, however, the specific terms herein are used descriptively rather than in a limiting sense, the scope of the invention being defined in the claims.

What I claim as new and desire to secure by Letters Patent is:

1. The combination with a cutter of a cylinder and piston for feeding plastic material to the cutter, a hydraulic cylinder and a piston therein with positive means connecting one piston to the other, means for applying uniform pressure to said pistons, and means for regulating the movement of the liquid in the hydraulic cylinder to control and equalize the motion of the feeding piston and the rate of feed therefrom.

2. The combination with a cutter of a cylinder and piston for feeding plastic material to the cutter, a hydraulic cylinder and a piston therein with positive gearing connecting one piston to the other, means for applying uniform pressure to the said pistons, and means for regulating the movement of the liquid in the hydraulic cylinder to control and equalize the motion of the feeding piston and the rate of feed therefrom.

3. The combination with a cutter of means for feeding plastic material to the cutter, a hydraulic cylinder and a piston therein with positive means connecting the hydraulic piston to said feeding means, means for applying uniform pressure to the feed, means for controlling the movement of the liquid in the hydraulic cylinder and means for adjusting the said means to regulate and equalize the feed.

4. The combination with a cutter for cakes, doughnuts and the like of a cylinder and piston for feeding dough to the cutter, a hydraulic cylinder and a piston therein, positive means connecting the hydraulic piston to the dough feeding piston, a valve for controlling the flow of the liquid in the hydraulic cylinder and hence the motion of the hydraulic piston and a bypass for said valve with a check valve providing for the return of the hydraulic piston and the liquid after the discharge of the dough from the dough feeding cylinder.

5. The combination with a cutter for cakes, doughnuts and the like of a cylinder and piston for feeding dough to the cutter, a hydraulic cylinder and a piston therein, positive means connecting the hydraulic piston to the dough feeding piston, a valve for controlling the flow of the liquid in the hydraulic cylinder and hence the motion of the hydraulic piston, means within the control of the operator for adjusting the valve regulating the advance of both pistons and the rate of feed of the dough, and a bypass for said valve with a check valve providing for the return of the hydraulic piston and the liquid after the discharge of the dough from the dough feeding cylinder.

6. The combination with a cutter for dropping doughnut blanks in the liquid grease, means for opening and closing the cutter at equal intervals to extrude the dough and cut the blanks of a cylinder and piston connected thereto to feed dough to the cutter and hydraulic controlling means positively connected to the feeding piston, and means for applying constant pressure to the feeding piston to advance the same, the hydraulic means including a throttle whereby the hydraulic control causes the motion of the piston to be uniform which gives a constant feed of the dough which makes the blanks uniform in size.

7. The combination with a cutter of a cylinder and piston connected thereto to feed dough to the cutter and hydraulic means positively connected to the feeding piston, said hydraulic means comprising a cylinder and piston, a valve controlling the hydraulic means, and means for applying constant pressure to the feeding piston.

8. The combination with a dough cutter and means for opening and closing the same to cut and drop the dough, of means for feeding dough to the cutter and hydraulic means for controlling the rate of feed and means for applying a uniform thrust to the feeding means so that the blanks dropped by the cutter are of uniform size.

9. The combination with a cutter for doughnuts or the like of means for feeding dough to the cutter, means for applying a predetermined constant pressure to the feed to operate the same and hydraulic means for controlling and equalizing the rate of feed.

10. The combination with a cutter of means for feeding dough to the cutter, an oil cylinder and a piston therein positively connected to the feed to control the same, a valve for controlling the speed of the hydraulic piston and a bypass for returning the liquid to the cylinder independently of said valve when the piston is withdrawn.

11. The combination with a cutter of means for feeding dough to the cutter, a hydraulic cylinder and a piston therein positively connected to the feed to control the same, a valve for controlling the speed of the hydraulic piston and a bypass for returning the liquid to the cylinder independently of said valve when the piston is withdrawn, and means for preventing the flow of liquid through said bypass when the piston is advancing.

12. The combination with a cutter of means for feeding dough to the cutter, a hydraulic cylinder and a piston therein positively connected to the feed to control the same, a valve for controlling the speed of the hydraulic piston and a bypass for returning the liquid to the cylinder independently of said valve when the piston is withdrawn, and means for preventing the flow of liquid through said bypass when the piston is advancing, a reserve tank with an air vent connected to said bypass to supply liquid to the hydraulic cylinder.

13. The combination with a cutter of means for feeding dough to the cutter, a hydraulic cylinder positively connected to the dough feed to determine the rate of feeding, means comprising a weight for applying a constant thrust to the feed to operate the same.

14. The combination with a cutter of means for feeding dough to the cutter, a hydraulic cylinder connected to the dough feed to determine the rate of feeding, means comprising a weight for applying a constant thrust to the feed to operate the same, and means for connecting the weight to the feed comprising a cable and a drum on which the cable is wound.

15. The combination with a doughnut cutter of a cylinder and piston connected thereto to feed dough or soft batter to the cutter to form a doughnut and hydraulic means positively connected to the feeding piston, and means for applying constant pressure to the feeding piston whereby the hydraulic means gives a constant feed.

16. The combination with a cutter for doughnut blanks of means for feeding dough or batter to the cutter at constant pressure, and hydraulic means for controlling the rate of feed to form doughnut blanks of uniform size.

IRA S. MOSHER.